May 29, 1945.  J. O. REED  2,377,183
METHOD FOR REFINING AND DISTILLING OLEORESIN
Filed May 3, 1941
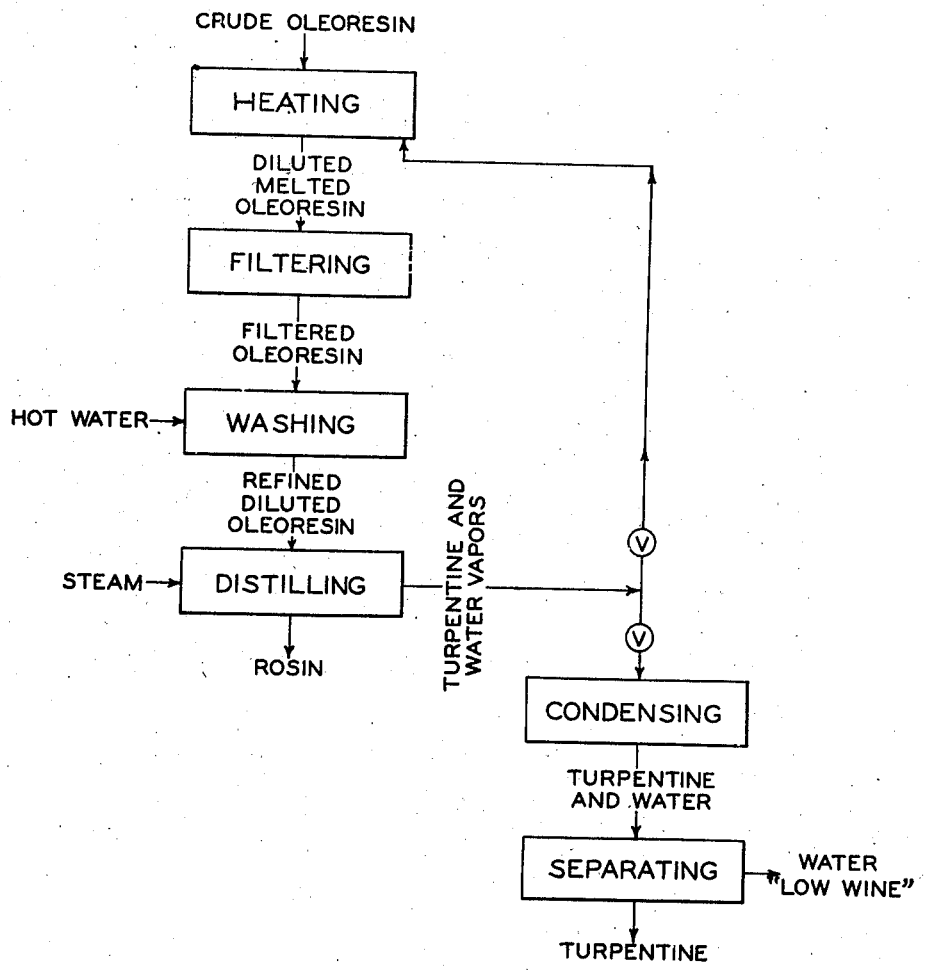
INVENTOR
Jesse O. Reed
BY
ATTORNEY Patented May 29, 1945

2,377,183

UNITED STATES PATENT OFFICE 2,377,183

METHOD FOR REFINING AND DISTILLING OLEORESIN

Jesse O. Reed, Washington, D. C., assignor to Claude R. Wickard, as Secretary of Agriculture of the United States of America, and to his successors in office Application May 3, 1941, Serial No. 391,662

8 Claims. (Cl. 260—109)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a process of refining and distilling crude oleoresin, and has among its objects the utilization of turpentine vapors as the solvent to dilute the crude oleoresin preparatory to refining it, thereby to produce a higher quality rosin, due to the fact that only the volatile constituents of turpentine are introduced into the crude oleoresin; the utilization of a part of the heat added in the distillation step to heat the crude oleoresin to render it more fluid, thereby to make the process more efficient; and such other objects as will be made more apparent from a consideration of the following specification and claims.

Crude oleoresin, as it exudes slowly from and over the scarified face of the tree into a collecting receptacle, is subject to contamination of various kinds and to physical and chemical changes. Pine needles, chips, fine pieces of bark, dust, insects, etc., are caught by the sticky surface of the oleoresin on the tree, or fall into the collecting receptacle to form the greater part of the contamination. Water, containing water-solubles, also constitutes one of the major constituents to be removed in an oleoresin refining process. Loss of turpentine by evaporation, oxidation of the unsaturated compounds comprising many of the constituents of oleoresin, isomerization of the resin acids, weather, etc., are responsible for the varying physical and chemical properties of crude oleoresin throughout the oleoresin producing season. It is the function of an oleoresin refining process to remove the contaminating materials, and to produce a purified oleoresin, from which a clear rosin, containing no undisssolved extraneous matter, can be produced.

Some oleoresin refining processes require heat, and the addition of a solvent, prior to filtration. Additional heat units are, therefore, required not only to heat the solvent in addition to the oleoresin, but also to distill off the same solvent. These additional heat requirements add to the cost of processing oleoresin, as compared to the older methods of distilling the crude oleoresin by direct fire in a copper still, and straining the rosin through cotton batting.

In some processes of refining crude oleoresin, turpentine is often used as the solvent. Turpentine is a very unstable and easily oxidized material. Upon exposure to air it changes in composition and in chemical properties. Therefore, when turpentine is redistilled, a residue often remains. If such turpentine is used as the diluent for the crude oleoresin, this residue will remain in the rosin, and the degree of contamination due to the residue will depend on the quantity of turpentine used and the extent of its contamination. It is essential that the turpentine be in its purest state when used as a solvent in an oleoresin refining process, in order to obtain a superior rosin.

In general, the procedure used in my process is similar to other oleoresin refining processes, viz: crude oleoresin is heated, diluted, filtered, processed, and then distilled to obtain turpentine and rosin. Usually, each step is performed in a separate and distinct apparatus, which functions independently of the other, except for delivery and discharge of the material being processed. However, according to my process, the crude oleoresin is diluted with turpentine vapors which are condensed in the crude oleoresin, whereby the residue from the turpentine is not introduced therein. Therefore, any amount of diluent may be used without degrading the rosin obtained. Dilution of the crude oleoresin to a turpentine content as high as 75% would not be considered excessive, although a dilution of a 50% to 60% turpentine content will give excellent filtering and washing results.

In my process, special consideration is given to the conservation and efficient utilization of heat. To do this, I have found it necessary that all apparatus to perform the process function together as a unit, so that the dissipated heat from one step is utilized in a subsequent step of the process.

In order to more clearly define my invention, the following examples are given. These are merely illustrative, and in no sense are to be taken as limiting the scope, or application of the invention.

As an illustration of my preferred process, reference may be made to the attached drawing showing a flow diagram of it.

In what may be considered the batch process, I may heat and dilute a batch of crude oleoresin in one zone at the same time that a charge of a prior batch of refined diluted oleoresin is being distilled in another zone. Heat required for heating the crude oleoresin, and the turpentine required for diluting it, are obtained from turpentine and steam vapors exhausted during distillation of the prior batch. Instead of the heat required for distilling off the surplus turpentine that is used for dilution of the oleoresin being wasted in the condenser water during distillation, I conserve this heat, and employ it to heat the crude oleoresin. I have found that my heating operation is more satisfactorily performed in this manner than by the usual method of employing live steam for this purpose, because the turpentine vapors, which are mixed with the steam vapors from the distillation apparatus, produce a dissolving as well as a heating action, which action reduces "scrape" readily into a liquid condition.

The amount of vapors returned to the crude oleoresin from the exhaust of the distillation apparatus during distillation, depends upon the amount of turpentine that is desired for use as a solvent. A preferred procedure is to use the vapors from the beginning of the distillation process, because it is at this point the ratio of turpentine to water or "low wines" is the greater. At this stage in the distillation a maximum amount of turpentine and a minimum amount of water is obtained from the exhaust and added to the crude oleoresin, also a minimum amount of heat units is admitted with the turpentine to the apparatus for heating and diluting the crude oleoresin. Any surplus heat beyond that required to heat the oleoresin to the necessary extent may be absorbed by a reflux condenser, or by any other means.

One of the most important features of my invention is that within reasonable limits no additional cost of processing results from diluting the crude oleoresin to a high turpentine content. This is made possible because of the fact that the heat required to distill off and recover the added turpentine solvent is reemployed, or saved, for heating the original crude oleoresin. By increasing the turpentine content, or the dilution of the crude oleoresin, improved results are obtained in filtering, and in washing and removing the water solubles and water from the filtered gum.

As a further illustration of my process, I prefer to heat the crude oleoresin in a closed vessel by means of vapors obtained from the distillation of oleoresin previously refined. I prefer to introduce the distillation vapors into the crude oleoresin in a quantity sufficient to dilute the oleoresin to a turpentine content of at least 40%. I may then filter the hot diluted oleoresin by forcing it through a filter, thereby separating the foreign materials therefrom. The said filter discharges the filtered diluted oleoresin into a tank that is partially filled with water. Because of the high percentage of turpentine dilution, the water present in the filtered oleoresin rapidly settles out. The settled oleoresin in then copiously washed, or mixed intimately with additional hot water, so as to remove the water soluble materials present in the oleoresin. After this washing, and the excessive water is allowed to settle out, the refined, relatively water-free oleoresin is then ready to be distilled.

I prefer to distil the refined oleoresin with steam in accordance with the usual procedure. Moisture and heat may be added by injecting live steam directly in the distillation charge, or water may be supplied and the charge heated in the usual manner. At the beginning of the distillation and after all the air has been evacuated from the still, I prefer to return the first part of the hot mixed distillation vapors of turpentine and water exhausted from the still to the heating apparatus, the apparatus having been filled with another batch of crude oleoresin equal to the one being distilled. By taking into consideration the amount and grade of crude oleoresin in each charge and by controlling the amount of turpentine derived from the first period of the distillation, and condensed in the dilution of the crude oleoresin, it is possible to dilute the crude oleoresin in each charge to the same extent. When the desired dilution of the batch of crude oleoresin being heated is obtained, the remaining mixed water and turpentine vapors from the distilling apparatus may be directed to a condenser. If equal amounts of turpentine vapors are passed back to dilute the successive batches of crude oleoresin, the amount of turpentine recovered in the condenser will be approximately the amount of turpentine present in the original crude oleoresin.

The rosin produced will be free of undissolved extraneous matter, brilliantly clear, and will not be contaminated by the products present in the residue obtained in the distillation of oxidized turpentine. A rosin of superior qualities will be produced.

I have also found that my invention is especially adaptable to a continuous system of processing and distilling oleoresin. In the foregoing examples I have endeavored to illustrate how my invention is practiced in a batch process. In a similar manner it may be practiced in a continuous system, the chief difference being that the crude material may be fed continuously and the end products continuously discharged.

I have also found that since the rate of output and the composition of the water-turpentine vapors from the distillation remain practically constant, it is possible to recycle a fixed portion of the water-turpentine vapors into crude oleoresin to be refined. The remaining vapors, which are condensed and recovered, represent the amount of turpentine in the original crude oleoresin. The vapors, which are recycled represent that portion of turpentine in the distilled oleoresin which was used and is to be reused for dilution. The constant rate of delivery of the water and turpentine vapors to the heating apparatus also makes it possible to obtain a uniform rate of heating and diluting of the crude products. The operation of the processing and distilling equipment as a unit is thereby facilitated and simplified. Of equal importance, however, is the fact that maximum yields of the finished products, both with respect to quantity and quality, are obtained.

Having thus described my invention, what I claim for Letters Patent is:

1. In a process for refining and distilling crude oleoresin, heating and diluting oleoresin by introducing and condensing in the oleoresin hot mixed distillation vapors of turpentine and water in one zone; moving the heated and diluted oleoresin to another zone; distilling in said other zone the heated diluted oleoresin by adding moisture and heating to separate the rosin from the turpentine and water introduced into the oleoresin in the heating and diluting zone, the turpentine contained in the oleoresin, and the moisture added in the distilling zone; and returning a portion of the hot mixed distillation vapors of turpentine and water from the distilling zone to the heating and diluting zone for heating and diluting other oleoresin.

2. In a process for refining and distilling crude oleoresin, heating and diluting a continuously fed charge of oleoresin by continuously introducing and condensing in a continuously fed charge of oleoresin hot mixed distillation vapors of turpentine and water in one zone; continuously moving the heated and diluted oleoresin to another zone; continuously distilling in said other zone the heated diluted oleoresin by adding moisture and heating to separate the rosin from the turpentine and water introduced into the oleoresin in the heating and diluting zone, the turpentine contained in the oleoresin, and the moisture added in the distilling zone; and continuously returning a portion of the hot mixed distillation vapors of turpentine and water from the distilling zone to the heating and diluting zone for heating and diluting the continuously fed charge of oleoresin.

3. The process as defined in claim 1, wherein the quantity of turpentine introduced and condensed in the oleoresin in the heating and diluting zone is sufficient to dilute the oleoresin to a turpentine content of at least 40%.

4. In a process for refining and distilling crude oleoresin, heating and diluting oleoresin by introducing and condensing in the oleoresin hot mixed vapors of turpentine and water, distilling the diluted oleoresin, and recovering the refined rosin.

5. In a process for refining and distilling crude oleoresin, heating and diluting crude oleoresin by introducing and condensing in the oleoresin hot mixed vapors of turpentine and water, filtering the heated and diluted crude oleoresin, thereby separating the foreign materials therefrom, distilling the filtered diluted oleoresin, and recovering the refined rosin.

6. A process for refining and distilling crude oleoresin comprising heating and diluting crude oleoresin by introducing and condensing in the crude oleoresin hot mixed vapors of turpentine and water in a quantity sufficient to dilute the crude oleoresin to a turpentine content of at least 40%, filtering the heated and diluted crude oleoresin, thereby separating the foreign materials therefrom, copiously washing the filtered oleoresin with water, settling out the excess water to produce a refined diluted oleoresin, and distilling off the turpentine from the refined diluted oleoresin to produce a refined rosin.

7. A process for refining and distilling crude oleoresin comprising heating and diluting crude oleoresin by introducing and condensing in the crude oleoresin hot mixed distillation vapors of turpentine and water in a quantity sufficient to dilute the crude oleoresin to a turpentine content of at least 40%, filtering the heated and diluted crude oleoresin, thereby separating the foreign materials therefrom, copiously washing the filtered oleoresin with water, settling out the excess water to produce a refined diluted oleoresin, adding moisture to and heating the refined diluted oleoresin to distill off turpentine and water from the refined oleoresin, thereby producing refined rosin, the while returning a part of the hot mixed distillation vapors of turpentine and water to another charge of crude oleoresin to heat and dilute it, condensing the remainder of the distillation vapors, and recovering the turpentine from the condensate.

8. A process for refining and distilling crude oleoresin comprising heating and diluting crude oleoresin by introducing and condensing in the crude oleoresin hot mixed distillation vapors of turpentine and water in a quantity sufficient to dilute the oleoresin to a turpentine content of at least 40%, filtering the heated and diluted crude oleoresin, thereby separating the foreign materials therefrom, copiously washing the filtered oleoresin with water, settling out the excess water to produce a refined oleoresin, adding moisture to and heating the refined diluted oleoresin to distill off turpentine and water from the refined oleoresin, thereby producing refined rosin, the while recycling a sufficient portion of the hot distillation vapors of turpentine and water into the crude oleoresin being refined in the continuous system to heat and dilute it, the while condensing the remaining distillation vapors and recovering the excess turpentine, and the while recovering the refined rosin.

JESSE O. REED.